(12) United States Patent
Kurita et al.

(10) Patent No.: US 10,190,680 B2
(45) Date of Patent: Jan. 29, 2019

(54) AUTOMATIC TRANSMISSION CONTROL APPARATUS

(71) Applicant: Mitsubishi Electric Corporation, Tokyo (JP)

(72) Inventors: Kazuhisa Kurita, Tokyo (JP); Chiaki Sugano, Tokyo (JP); Masayuki Aota, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 184 days.

(21) Appl. No.: 15/259,423

(22) Filed: Sep. 8, 2016

(65) Prior Publication Data

US 2017/0299054 A1    Oct. 19, 2017

(30) Foreign Application Priority Data

Apr. 13, 2016    (JP) ................ 2016-080007

(51) Int. Cl.
| | |
|---|---|
| *F16H 61/12* | (2010.01) |
| *F16H 61/32* | (2006.01) |
| *F16H 63/42* | (2006.01) |
| *F16H 59/10* | (2006.01) |
| *F16H 61/28* | (2006.01) |
| *F16H 59/08* | (2006.01) |

(52) U.S. Cl.
CPC ......... *F16H 61/12* (2013.01); *F16H 61/2807* (2013.01); *F16H 61/32* (2013.01); *F16H 63/42* (2013.01); *F16H 59/08* (2013.01); *F16H 2061/326* (2013.01); *F16H 2063/423* (2013.01)

(58) Field of Classification Search
CPC ...... F16H 61/12; F16H 61/32; F16H 61/2807; F16H 63/42; F16H 59/105; F16H 2061/326; F16H 2063/423
USPC ...................................... 701/62, 63
See application file for complete search history.

(56) References Cited

U.S. PATENT DOCUMENTS

| | | | | |
|---|---|---|---|---|
| 5,598,334 | A | * | 1/1997 | Shin ............... F16H 61/12 701/51 |
| 8,401,747 | B2 | * | 3/2013 | Ito ................ F16H 61/12 701/51 |
| 2006/0201768 | A1 | * | 9/2006 | Hori .............. F02N 11/103 192/84.1 |
| 2017/0350502 | A1 | * | 12/2017 | Lee ............... F16H 61/12 |

FOREIGN PATENT DOCUMENTS

JP    2002-48234 A    2/2002

* cited by examiner

*Primary Examiner* — Jacob S. Scott
*Assistant Examiner* — Tinh Dang
(74) *Attorney, Agent, or Firm* — Sughrue Mion, PLLC; Richard C. Turner

(57) ABSTRACT

There is obtained an automatic transmission control apparatus that makes it possible that even when an abnormality occurs in a sensor for detecting a motor rotation angle or the like, control of an automatic transmission is appropriately performed. Inputted first, second, and third detection signals are compared with one another; it is determined that at least two detection signals, out of these detection signals, that coincide with each other are normal and another detection signal is abnormal; then, based on the result of the determination, switching of the ranges of the automatic transmission is controlled.

15 Claims, 3 Drawing Sheets

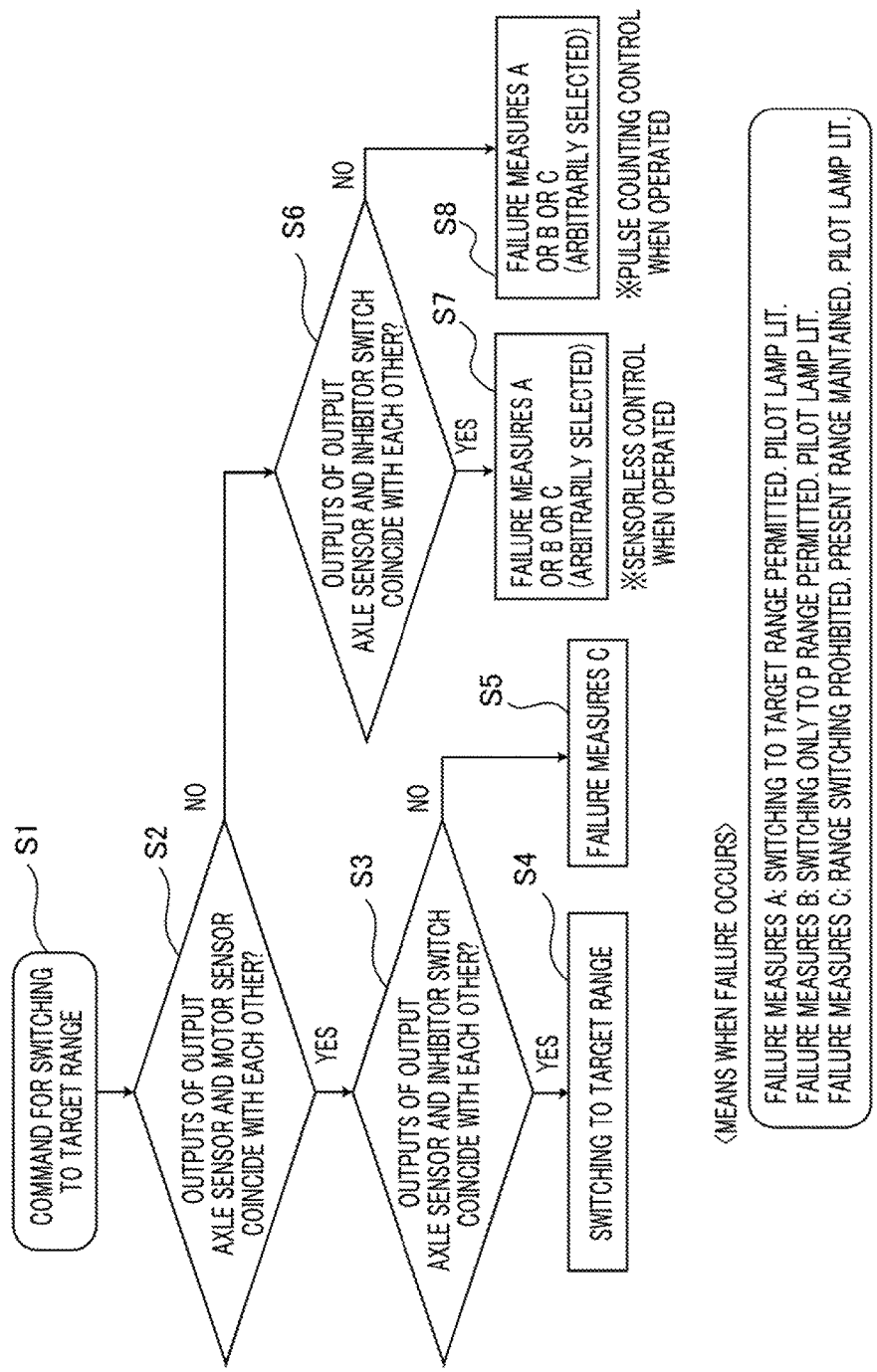

AUTOMATIC TRANSMISSION CONTROL APPARATUS

BACKGROUND OF THE INVENTION

Field of the Invention

The present invention relates to an automatic transmission control apparatus mounted in a vehicle such as an automobile.

Description of the Related Art

As is well known, when a vehicle driver operates the shift lever from the driver's seat, a signal based on the shift operation is transmitted to a control unit. In accordance with a signal to be inputted to it, the control unit outputs an operation signal to an actuator for switching traveling ranges of an automatic transmission. The actuator, which has received the operation signal from the control unit, rotates an output axle for driving a hydraulic pressure switching valve of the automatic transmission up to a predetermined position, based on the operation signal, so as to switch the shift range of the automatic transmission to a predetermined shift range.

In general, an automatic transmission control apparatus is configured in such a manner as described above. For example, a conventional automatic transmission control apparatus disclosed in Patent Document 1 is provided with a rotation angle sensor, at an actuator side, that detects the rotation angle of the output axle of the actuator, a position sensor, at a hydraulic pressure switching valve side, that detects the rotation position of the output axle for driving the hydraulic pressure switching valve, a driving circuit for driving the actuator, and a control circuit that determines the shift range, based on a traveling range designated by a shift range selection apparatus, and provides a driving command to the driving circuit; when an abnormality occurs in any one of the rotation angle detection sensor at an actuator side and the position sensor at the hydraulic pressure switching valve side, processing by the control circuit is performed by use of the other sensor.

The conventional automatic transmission control apparatus disclosed by Patent Document 1 allegedly makes it possible that because when any one of the rotation angle detection sensor and the position sensor is abnormal, processing by the control circuit is performed by use of the other sensor, the control circuit can provide a driving command to the driving circuit for the actuator, based on the other sensor, even when an abnormality occurs in the one sensor, and hence the range of the automatic transmission can automatically be switched to a predetermined target range for which the driver has operated.

PRIOR ART REFERENCE

Patent Document

[Patent Document 1] Japanese Patent Application Laid-Open No. 2002-048234

However, in the conventional automatic transmission control apparatus disclosed in Patent Document 1, when an abnormality occurs in any one of the sensors, it cannot be determined which sensor is abnormal; thus, the correct range position at a time when the abnormality has occurred cannot be ascertained and hence it is difficult in practice to operate the actuator.

The present invention has been implemented in order to solve the foregoing problems in a conventional automatic transmission control apparatus; the objective thereof is to obtain an automatic transmission control apparatus that makes it possible that when an abnormality occurs in any one of sensors for detecting the rotation angle and the like of the motor, the sensor in which the abnormality has occurred is determined and hence control of the automatic transmission is appropriately performed.

SUMMARY OF THE INVENTION

An automatic transmission control apparatus according to the present invention includes
a control unit that generates a range switching command signal for switching ranges of an automatic transmission mounted in a vehicle, based on shift operation by a driver of the vehicle,
a motor to be driven based on the range switching command signal from the control unit,
a deceleration mechanism unit that decelerates a rotation speed of the motor,
an output axle that is driven by the deceleration mechanism unit so as to drive a shift axle for switching the ranges of the automatic transmission,
a motor rotation angle detection unit that detects a rotation angle of a rotor of the motor and then inputs to the control unit a first detection signal having information corresponding to the detected rotation angle of the rotor of the motor,
an output axle rotation angle detection unit that detects a rotation angle of the output axle and then inputs to the control unit a second detection signal having information corresponding to the detected rotation angle of the output axle, and
a position sensor that detects a rotation position of the shift axle of the automatic transmission and then inputs to the control unit a third detection signal having information corresponding to the detected rotation position of the shift axle.

The automatic transmission control apparatus is characterized in that the control unit monitors each of the inputted first, second, and third detection signals, determines that two detection signals having the respective information items that coincide with each other are normal and that another detection signal having information that does not coincide with the information items of the two detection signals is abnormal, and then controls switching of the ranges of the automatic transmission, based on the result of the determination.

An automatic transmission control apparatus according to the present invention includes
a motor rotation angle detection unit that detects a rotation angle of a rotor of the motor and then inputs to the control unit a first detection signal having information corresponding to the detected rotation angle of the rotor of the motor,
an output axle rotation angle detection unit that detects a rotation angle of the output axle and then inputs to the control unit a second detection signal having information corresponding to the detected rotation angle of the output axle, and
a position sensor that detects a rotation angle of the shift axle of the automatic transmission and then inputs to the control unit a third detection signal having information corresponding to the detected rotation angle of the shift axle.

The control unit monitors each of the inputted first, second, and third detection signals, determines that two detection signals having the respective information items that coincide with each other are normal and that another detection signal having information that does not coincide with the information items of the two detection signals is abnormal, and then controls switching of the ranges of the automatic transmission, based on the result of the determination; therefore, when an abnormality occurs in any one of sensors for detecting the rotation angle and the like of the motor, the sensor in which the abnormality has occurred is determined and hence control of the automatic transmission is appropriately performed; as a result, the reliability of the automatic transmission control apparatus can be enhanced.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3 is a flowchart for explaining failure determinations and failure measures in the automatic transmission control apparatus according to Embodiment 1 of the present invention.

DETAILED DESCRIPTION OF THE PREFERRED EMBODIMENTS

Figure 1:
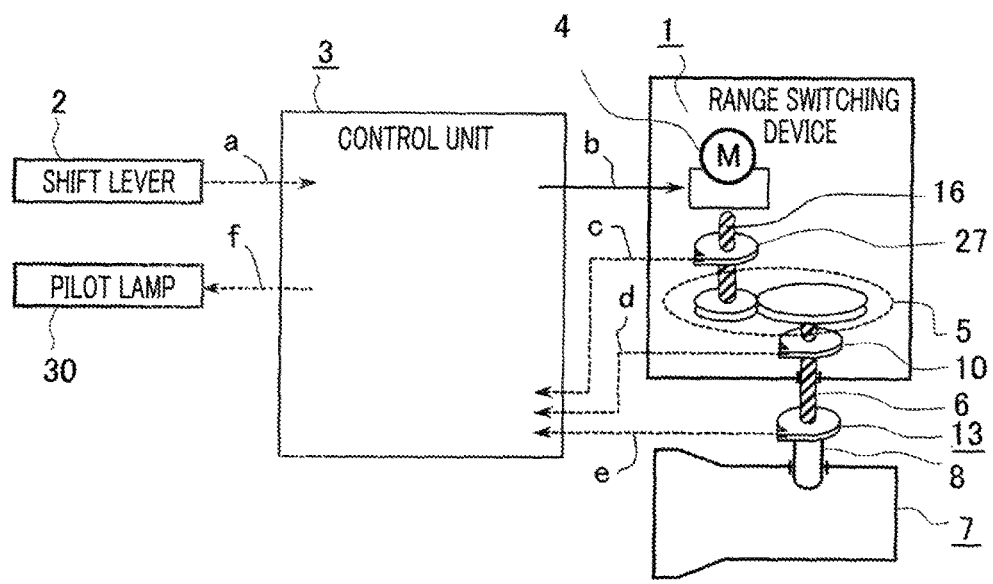
FIG. 1 is a system schematic diagram illustrating an automatic transmission control apparatus according to Embodiment 1 of the present invention and peripheral devices thereof.

Hereinafter, an automatic transmission control apparatus according to Embodiment 1 of the present invention will be explained in detail by use of FIGS. 1 through 3. In each of FIGS. 1 and 2, the same reference characters denote the same constituent elements.

Embodiment 1

Figure 2:
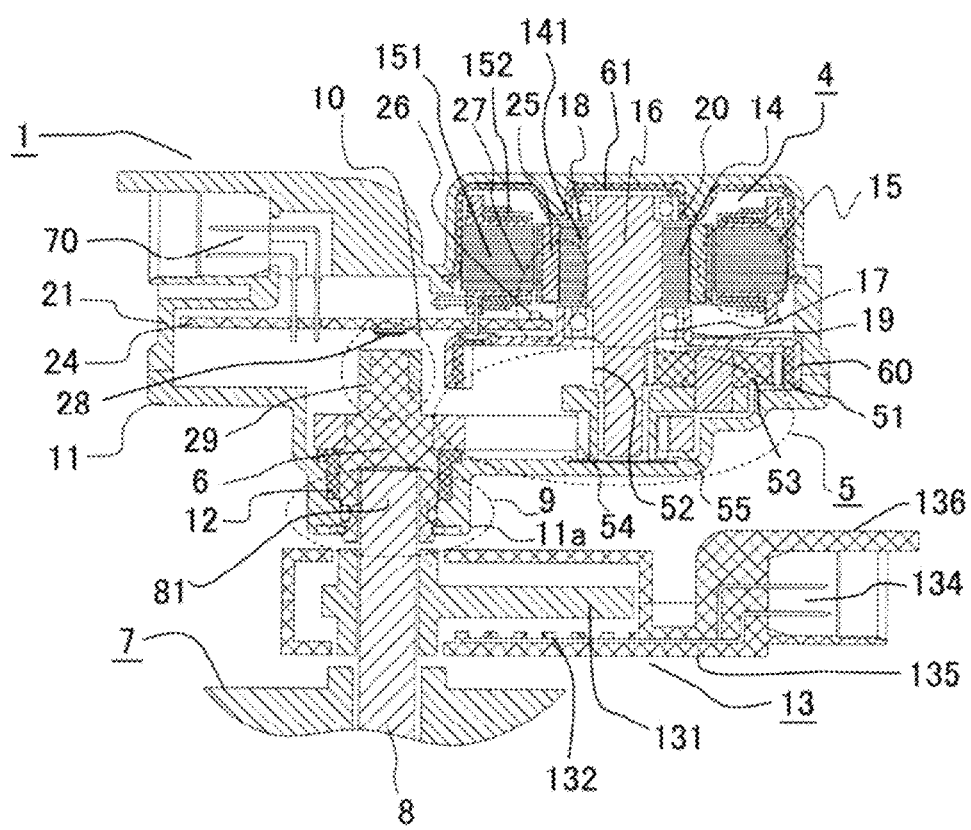
FIG. 2 is a longitudinal cross-sectional view illustrating a range switching device and a shift position detection unit of the automatic transmission control apparatus according to Embodiment 1 of the present invention.

FIG. 1 is a system schematic diagram illustrating the automatic transmission control apparatus according to Embodiment 1 of the present invention and peripheral devices thereof. In FIG. 1, the automatic transmission control apparatus according to Embodiment 1 of the present invention includes a control unit 3 formed of a microprocessor, a range switching device 1 as an actuator (hereinafter, referred to as a range switching device), and an inhibitor switch 13 as a shift position detection unit.

The control unit 3 generates a range switching command signal b, which is calculated based on a shift signal a from a shift lever 2 to be operated by a vehicle driver, and then provides the range switching command signal b to the range switching device 1. The range switching device 1 includes a motor 4 to be driven based on the range switching command signal b from the control unit 3 and a deceleration mechanism unit 5 for decelerating the rotation speed of the rotor shaft of the motor 4. An automatic transmission 7 mounted in the vehicle has a shift axle 8 that controls a hydraulic pressure valve for switching the traveling range of the vehicle. The shift axle 8, which is driven to rotate by an output axle 6 of the range switching device 1, switches the hydraulic pressure valve so as to switch the ranges (for example, P, R, N, and D) of the automatic transmission 7.

A motor rotation angle detection unit 27 provided in the range switching device 1 detects the rotation angle of a rotor shaft 16 of the motor 4 and then inputs to the control unit 3 a first detection signal c having information corresponding to the detected rotation angle of the rotor shaft of the motor 4. An output axle rotation angle detection unit 10 provided in the range switching device 1 detects the rotation angle of the output axle 6 of the range switching device 1 and then inputs to the control unit 3 a second detection signal d having information corresponding to the detected rotation angle of the output axle 6. The inhibitor switch 13 detects the shift position of the automatic transmission 7 and then inputs to the control unit 3 a third detection signal e having information corresponding to the detected shift position, i.e., information corresponding to the rotation position of the shift axle 8.

The control unit 3 monitors each of the first detection signal c, the second detection signal d, and the third detection signal e, and determines, as described later, whether or not an abnormality exists in any one of the motor rotation angle detection unit 27 and the output axle rotation angle detection unit 10 in the range switching device 1, based on the respective information items included in the detection signals; in the case where it is determined that an abnormality exists in any one of the motor rotation angle detection unit 27 and the output axle rotation angle detection unit 10, the control unit 3 outputs an abnormality detection signal f so as to light a pilot lamp 30 and thereby notify the driver of the abnormality.

Next, the range switching device and the inhibitor switch, as a shift position detection unit, of the automatic transmission control apparatus according to Embodiment 1 of the present invention will be explained in detail. FIG. 2 is a longitudinal cross-sectional view illustrating the range switching device and the shift position detection unit of the automatic transmission control apparatus according to Embodiment 1 of the present invention. In FIG. 2, the range switching device 1 includes the motor 4, the deceleration mechanism unit 5, the output axle 6, a circuit board 24, the motor rotation angle detection unit 27, the output axle rotation angle detection unit 10, a first housing 11 as a front body, and a second housing 21 as a rear body.

The motor 4 includes a rotor 14 fixed on the rotor shaft 16 and a stator 15 having an inner circumferential surface that faces the outer circumferential surface of the rotor 14 with a predetermined gap. The rotor 14 includes a rotor iron core 141 formed of a great number of magnetic thin plates stacked in the axle direction thereof and two or more magnetic-field poles 25 formed of permanent magnets arranged on the rotor iron core 141 in such a way as to be spaced a predetermined distance apart from one another in the circumferential direction thereof. The stator 15 has a stator iron core 151 formed of a great number of magnetic thin plates stacked in the axle direction and a stator winding 152 wound, for example, in a concentrated manner around the stator iron core 151. The inner circumferential surface of the stator iron core 151 faces the outer circumferential surface of the rotor iron core 141 with the predetermined gap. The motor 4 is formed as a permanent-magnet brushless motor.

The rotor shaft 16 of the motor 4 is pivotably supported by a first rolling bearing 17 and a second rolling bearing 18. The first rolling bearing 17 is fixed at the front side, which is the output side of the motor 4, in such a way as to fit into a bearing fixing portion 19 of a first metal plate 60 fixed to the inner surface of the second housing 21. The second rolling bearing 18 is fixed at the rear side of the motor 4 in such a way as to fit into a bearing fixing portion 20 of a second metal plate 61 fixed to the inner surface of the second housing 21. The outer circumferential surface of the stator iron core 151 of the motor 4 is fixed in such a way as to fit into the inner surface of the second metal plate 61.

The deceleration mechanism unit 5 is provided with
a first gear 51, which is an internal-tooth gear formed on the inner circumferential surface of the first metal plate 60,
a second gear 52 formed on part of the outer circumferential surface of the rotor shaft 16 of the motor 4,
a third gear 53, which is a epicyclic gear that engages with the first gear 51 and the second gear 52,
a fourth gear 54 that is pivotably coupled with the axle of the third gear 53 and is pivotably supported by the outer circumferential surface of the rotor shaft 16, and
a fifth gear 55 that is fixed to the outer circumferential surface of the output axle 6 of the range switching device 1 and has internal teeth, at an extending portion extending in the radial direction, that engage with the fourth gear 54.

The output axle 6 of the range switching device 1 is pivotably supported by a sliding bearing member 12 provided in a supporting cylindrical portion 11a of the first housing 11. As described above, the fifth gear 55 is fixed to the outer circumferential surface of the output axle 6. The circuit board 24 is fixed in the second housing 21 and is provided with a motor driving circuit (unillustrated) connected with the control unit 3 (refer to FIG. 1) through the connector 70 provided in the second housing 21.

The motor rotation angle detection unit 27 is configured with the magnetic-field poles 25 formed of permanent magnets provided in the rotor 14 and a motor sensor 26 fixed on the circuit board 24 at a position that faces one axle-direction end of the magnetic-field pole 25. The motor sensor 26 is configured with, for example, two or more hall-switch magnetic sensors. These magnetic sensors are mounted in the vicinity of the one axle-direction end of the rotor 14 and detect the rotation angle of the rotor 14 by use of leakage magnetic fields of the permanent magnets that form the magnetic-field poles 25 of the rotor 14; the first detection signal c detected by the motor sensor 26 is inputted to the control unit 3 through wiring strip conductors (unillustrated) formed on the circuit board 24 and the connector 70.

The output axle rotation angle detection unit 10 is configured with a two-pole-magnetized permanent magnet 29, fixed with an adhesive or the like to one axle-direction end of the output axle 6 disposed in such a way as to be spaced apart from the rotor shaft 16 in the radial direction, and an output axle sensor 28, fixed on the circuit board 24 at a position that faces the permanent magnet 29 through a gap. The output axle sensor 28 is formed of, for example, a flux-orientation-detection magnetic sensor that converts a change in the magnetic flux of the permanent magnet 29, caused by rotation of the output axle 6, into an electric signal; the output axle sensor 28 detects the rotating magnetic orientation of the permanent magnet 29; the second detection signal d detected by the output axle sensor 28 is inputted to the control unit 3 through the connector 70 and wiring strip conductors (unillustrated) formed on the circuit board 24.

The first housing 11 and the second housing 21 are integrally fixed to each other by use of an unillustrated coupling member such as a screw in such a way that the respective opposing endfaces abut on each other. One of or both of the first housing 11 and the second housing 21 are fixed on the mechanism unit (unillustrated) of the vehicle or the automatic transmission 7.

An axis-direction end 81 of the shift axle 8 in the automatic transmission 7 is spline-fitted into a recess portion 6 formed in the other axle-direction end of the output axle 6. The output axle 6 and the shift axle 8, which have been spline-fitted into each other, are pivotably supported by the supporting cylindrical portion 11a of the first housing 11 and are included in the range switching unit 9 of the range switching device 1.

Next, the inhibitor switch 13, as a shift position detection unit, will be explained. The inhibitor switch 13 is fixed to the shift axle 8 in such a way as to be penetrated by the shift axle 8, provided with two or more contacts 132 that are separated from one another and a movable member 131 that rotates along with the shift axle 8, and is further provided with a first cover 135 that is formed of an insulating material and encloses part of the movable member 131, a second cover 136 that is formed of an insulating material, fixed to the first cover 135, and encloses the movable member 131, and a connector 134 that is partially embedded in the first cover 135 and connected with the contact 132.

On a flat portion that spreads in the shape of a sector around the vicinity of the shift axle 8, the two or more contacts 132 are arranged in such a way as to be separated from one another in both the radial and circumferential directions. The movable member 131 has sliding contacts (unillustrated) on its surface that faces the contacts 132. Regardless of the pivotal position of the movable member 131, the sliding contact constantly and electrically makes contact with a specific contact out of the contacts 132 and electrically makes contact with respective different contacts among the contacts 132 in accordance with the pivotal positions.

Based on which contact 132 makes contact with the sliding contact provided on the movable member 131, the rotation position of the movable member 131, i.e., the rotation position of the shift axle 8 can be determined. In accordance with its rotation position, the shift axle 8 switches the hydraulic pressure switching valve (unillustrated) for switching the range of the automatic transmission 7; thus, the rotation position of the shift axle 8, i.e., the rotation position of the movable member 131 corresponds to the range of the automatic transmission 7.

The third detection signal e, as a signal indicating the shift position, that is created based on the state of contact between the sliding contact provided on the movable member 131 and the contact 132 is inputted to the control unit 3 through the connector 134.

Detailed explanation for the shift position detection unit 13 will be omitted in Embodiment 1; however, the shift position detection unit 13 may have a configuration similar to that disclosed, as the position sensor, in Patent Document 1, described above.

Next, there will be explained the failure determination on and the failure measures for each of the motor rotation angle detection unit 27 and the output axle rotation angle detection unit 10 in the automatic transmission control apparatus, configured in such a manner as described above, according to Embodiment 1 of the present invention. FIG. 3 is a flowchart for explaining failure determinations and failure measures in the automatic transmission control apparatus according to Embodiment 1 of the present invention.

Hereinafter, the flowchart represented in FIG. 3 will mainly be explained; the explanation will be made by appropriately utilizing FIGS. 1 and 2. It is assumed that in the step S1, the driver of the vehicle operates the shift lever 2 so as to generate the shift signal a, and inputs it to the control unit 3. Based on the inputted shift signal a, the control unit 3 generates the range switching command signal b for switching the range to a target range and then inputs the range switching command signal b to the range switching device 1. Based on the range switching command signal b from the control unit 3, the range switching device 1 drives the motor 4 by means of the motor driving circuit.

When based on the range switching command signal b, the motor 4 is driven and hence the rotor 14 rotates by a predetermined amount, the second gear 52 formed on the rotor shaft 16 and the third gear 53, which is an epicyclic gear engaged with the first gear 51, pivot by a predetermined amount around the rotor shaft 16. Because the third gear 53 pivots by a predetermined amount around the rotor shaft 16, the fourth gear 54 pivotably coupled with the axle of the third gear 53 is driven by the third gear 53 so as to pivot by a predetermined angle on the rotor shaft 16.

Because the fourth gear 54 pivots by a predetermined angle, the fifth gear 55 pivots by a predetermined angle, so that the output axle 6 and the shift axle 8 are made to pivot by a predetermined angle. Because the shift axle 8 pivots by a predetermined angle, the hydraulic pressure valve for switching the range is switched in accordance with the pivotal angle, and the range of the automatic transmission is switched to the target range in accordance with the shift signal a. Because the range of the automatic transmission has been switched to the target range in accordance with the shift signal a, the motor 4 in the range switching device 1 is controlled in such a way that the rotation thereof is stopped at the present rotation position.

In this situation, the motor sensor 26 in the motor rotation angle detection unit 27 detects a change in the magnetic flux, caused by travel of the magnetic-field pole 25 that faces the motor sensor through a gap, and then inputs to the control unit 3 through the connector 70 the change in the magnetic flux, as the first detection signal c corresponding to the rotation angle of the rotor 14. The output axle sensor 28 in the output axle rotation angle detection unit 10 detects a change in the magnetic flux, caused by travel of the permanent magnet 29 that faces the output axle sensor 28 through a gap, and then inputs to the control unit 3 through the connector 70 the change in the magnetic flux, as the second detection signal d corresponding to the rotation angle of the output axle 6 that rotates through the intermediary of the deceleration mechanism unit 5.

The movable member 131 in the inhibitor switch 13 as a shift position detection unit rotates along with the shift axle 8 coupled with the output axle 6; when the automatic transmission is switched to the target range in accordance with the shift signal a, the movable member 131 stops at the present rotation position. In this situation, through the connector 134, the inhibitor switch 13 inputs to the control unit 3 the third detection signal e, as a signal corresponding to the state of electric contact between the sliding contact and the contact 132 at the position where the movable member 131 has stopped.

Next, in the step S2 in FIG. 3, the control unit 3 determines whether or not the second detection signal d from the output axle sensor 28 in the output axle rotation angle detection unit 10 coincides with the first detection signal c from the motor sensor 26 in the motor rotation angle detection unit 27. In this situation, when it is assumed that the deceleration rate at the deceleration mechanism unit 5 is $\alpha$, the determination on the coincidence between the first detection signal c and the second detection signal d is the comparison between the second detection signal d and a value [$\alpha \cdot c$] obtained by multiplying the first detection signal c by the deceleration rate $\alpha$. Alternatively, the comparison between the first signal c and a value [$d/\alpha$], obtained by dividing the second detection signal d by the deceleration rate $\alpha$, may be made.

When it is determined in the step S2 that the second detection signal d coincides with the first detection signal c (Yes), the step S2 is followed by the step S3, where it is determined whether or not the second detection signal d from the output axle sensor 28 in the output axle rotation angle detection unit 10 coincides with the third detection signal e from the inhibitor switch 13.

When it is determined in the step S3 that the second detection signal d coincides with the third detection signal e (Yes), it is suggested that all of the motor rotation angle detection unit 27, the output axle rotation angle detection unit 10, and the inhibitor switch 13 are normal; then, in the step S4, switching of the automatic transmission 7 to the target range is completed.

When it is determined in the step S2 that the first detection signal c from the motor sensor 26 in the motor rotation angle detection unit 27 does not coincide with the second detection signal d from the output axle sensor 28 in the output axle rotation angle detection unit 10 (No: failure determination), the step S2 is followed by the step S6, where it is determined whether or not the second detection signal d from the output axle sensor 28 in the output axle rotation angle detection unit 10 coincides with the third detection signal e from the inhibitor switch 13.

When it is determined in the step S6 that the second detection signal d coincides with the third detection signal e (Yes), the control unit 3 determines that only the first detection signal c from the motor sensor 26 is abnormal (failure determination); then, the step S6 is followed by the step S7. The motor 4 is regarded as the member that has failed.

Because in this case, it is suggested that the first detection signal c, which is the output value of the motor sensor 26 in the motor rotation angle detection unit 27, is abnormal, the motor sensor 26 cannot be utilized in controlling the motor 4; therefore, in the case where after it is determined that the motor sensor 26 has failed, some sort of operation is performed, the motor 4 is driven through sensorless control and the shift position is detected based on the second detection signal d from the output axle sensor 28 in the output axle rotation angle detection unit 10 and the third detection signal e, which is the output value of the inhibitor switch 13. The details of processing in the step S7 will be described later.

Next, when it is determined in the step S6 that the second detection signal d does not coincide with the third detection signal e, the control unit 3 determines that only the second detection signal d, which is the output value of the output axle sensor 28 in the output axle rotation angle detection unit 10, is abnormal (failure determination); then, the step S6 is followed by the step S8.

In this case, it is assumed that the member that has failed is the output axle rotation angle detection unit 10. In other words, because the output value of the output axle sensor 28 in the output axle rotation angle detection unit 10 is abnormal, the correct rotation angle (=the shift position) of the output axle 6 cannot be detected in the range switching device 1; therefore, in the case where after it is determined that the output axle sensor 28 has failed, some sort of operation is performed, the ranges are switched through pulse counting by the motor sensor 26 in the motor rotation angle detection unit 27, based on information items such as pulse counts of the motor sensor 26 and the shift angles of the respective shift positions, which have preliminarily been stored in the control unit 3 through learning at a time when the range switching device 1 is mounted in the vehicle, and then it is determined, based on the output value of the inhibitor switch 13, whether or not switching to the target shift position has been completed. The details of processing in the step S8 will be described later.

When it is determined in the step S3 that the third detection signal e, which is the output value of the inhibitor switch 13, does not coincide with the second detection signal d from the output axle sensor 28 in the output axle rotation angle detection unit 10, the control unit 3 determines that the third detection signal e, which is the output value of the inhibitor switch 13, is abnormal (failure determination); then, the step S3 is followed by the step S5.

In this case, any one of the members, after the output axle 6, such as the fitting portion between the output axle 6 and the shift axle 8 and the inhibitor switch 13 is regarded as the member that has failed; alternatively, for example, the range switching device 1 is regarded as the member that has fallen from the automatic transmission 7. In this case, the range switching device 1 can operate; however, because the probability that the driving force of the range switching device 1 is not transferred to the shift axle 8 of the automatic transmission 7 is high, the control unit 3 implements processing of prohibiting range-switching operation. The details of processing in the step S5 will be described later.

Next, although not represented in the flowchart in FIG. 3, in the case where none of the first detection signal c, which is the output value of the motor sensor 26 in the motor rotation angle detection unit 27, the second detection signal d, which is the output value of the output axle sensor 28 in the output axle rotation angle detection unit 10, and the third detection signal e, which is the output value of the inhibitor switch 13, coincides with one another, any one of the peripheral members of the range switching device 1 is regarded as having a serious failure, and hence the control unit 3 implements processing of prohibiting range-switching operation.

As the failure operation pattern at a time when the control unit 3 makes a determination on each of respective abnormality occurrence patterns of the foregoing detection units, the following measures can be taken.

(1) In the Case where Target-Range Switching Operation is Permitted (Failure Measures A)
<Abnormal Patterns of Detection Means, Against which Failure Measures A can be Applied>
  In the case where an output abnormality occurs only in the motor sensor 26 of the motor rotation angle detection unit 27
  In the case where an output abnormality occurs only in the output axle sensor 28 of the output axle rotation angle detection unit 10
<Operation Means>
  In the case where it is determined that the output value of the motor sensor 26 in the motor rotation angle detection unit 27 is abnormal, the motor is driven through sensorless control and the range is switched to an arbitrary range.
  In the case where it is determined that the output value of the output axle sensor 28 in the output axle rotation angle detection unit 10 is abnormal, the motor is driven through pulse counting and the range is switched to an arbitrary range.

(2) In the Case where Operation of Switching Only to P Range is Permitted (Failure Measures B)
<Abnormal Patterns of Detection Means, Against which Failure Measures B can be Applied>
  In the case where an output abnormality occurs only in the motor sensor 26 of the motor rotation angle detection unit 27
  In the case where an output abnormality occurs only in the output axle sensor 28 of the output axle rotation angle detection unit 10
<Operation Means>
  In the case where it is determined that the output value of the motor sensor 26 in the motor rotation angle detection unit 27 is abnormal, the motor is driven through sensorless control and the range is switched only to P range.
  In the case where it is determined that the output value of the output axle sensor 28 in the output axle rotation angle detection unit 10 is abnormal, the motor is driven through pulse counting and the range is switched only to P range.
  Alternatively, without relying on the position detection, the motor is driven only in one direction for P range so that the range switching device 1 is physically stopped by being hit to a wall face provided on a detent plate in the automatic transmission 7, and when the motor energization current exceeds a predetermined threshold value, it is determined that the switching to P range has been completed, and then electric power to the motor is cut off so that the switching to P range is implemented.
  After the range has been switched to P range, switching to any other range is not permitted until the abnormality in the angle detection unit, which has been determined as being faulty, is eliminated.

(3) In the Case where any Range Switching Operation is Prohibited (Failure Measures C)
<Abnormal Patterns of Detection Means, Against which Failure Measures C can be Applied>
  In the case where an output abnormality occurs only in the motor sensor 26 of the motor rotation angle detection unit 27
  In the case where an output abnormality occurs only in the output axle sensor 28 of the output axle rotation angle detection unit 10
  In the case where an output abnormality occurs only in the inhibitor switch 13
  In the case where none of the output values of the respective detection units coincides with one another
<Operation Means>
  Even when the control unit 3 receives the shift signal a from the shift lever 2, switching from the present shift position is not permitted. Switching to any other range is not permitted until the abnormality in the angle detection unit, which has been determined as being faulty, is eliminated.

In any one of the foregoing abnormality patterns listed in the failure measures A, the failure measures B, and the failure measures C, the driver is notified of occurrence of an abnormality by means of, for example, lighting the pilot lamp 30 in the car, when the control unit 3 detects the occurrence of any failure.

In the step S4 in FIG. 3, because no abnormality is recognized in any one of the motor rotation angle detection unit 27, the output axle rotation angle detection unit 10, and the inhibitor switch 13, switching to the target range is permitted.

In the step S5, because it has been determined that only the inhibitor switch 13 is abnormal, range switching is not permitted. Thus, failure measures C is taken, so that range switching is not permitted and the present range is maintained.

In the step S7, because it has been determined that only the motor rotation angle detection unit 27 is abnormal, any one of the failure measures A, the failure measures B, and the failure measures C is arbitrarily selected. In this case, the operation is performed through sensorless control.

In the step S8, because it has been determined that only the output axle rotation angle detection unit 10 is abnormal, any one of the failure measures A, the failure measures B, and the failure measures C is arbitrarily selected. In this case, the operation is performed through pulse counting control.

As described above, the control unit 3 monitors the three sensors, i.e., the motor sensor 26 of the motor rotation angle detection unit 27, the output axle sensor 28 of the output axle rotation angle detection unit 10, and the inhibitor switch 13, so that it is made possible to localize to some extent the abnormality-occurrence position at a time when an abnormality has occurred; concurrently, because the localization of the abnormality-occurrence position makes it possible to perform the operation through a normal detection means, it is made possible that as the counter measures against the failure, an arbitrary operation mode can be selected from the foregoing variants (1) through (3).

Various modifications and alterations of this invention will be apparent to those skilled in the art without departing from the scope and spirit of this invention, and it should be understood that this is not limited to the illustrative embodiments set forth herein.

What is claimed is:

1. An automatic transmission control apparatus comprising:
    a controller that generates a range switching command signal for switching ranges of the automatic transmission, based on a shift operation;
    a motor to be driven based on the range switching command signal from the controller;
    a deceleration mechanism that decelerates a rotation speed of the motor;
    an output axle that is driven by the deceleration mechanism so as to drive a shift axle for switching the ranges of the automatic transmission;
    a motor rotation angle detector that detects a rotation angle of a rotor of the motor and then inputs to the controller a first detection signal having information corresponding to the detected rotation angle of the rotor of the motor;
    an output axle rotation angle detector that detects a rotation angle of the output axle and then inputs to the controller a second detection signal having information corresponding to the detected rotation angle of the output axle; and
    a position sensor that detects a rotation position of the shift axle of the automatic transmission and then inputs to the controller a third detection signal having information corresponding to the detected rotation position of the shift axle,
    wherein the controller monitors each of the inputted first, second, and third detection signals, determines that two detection signals having the respective information items that coincide with each other are normal and that another detection signal having information that does not coincide with the information items of the two detection signals is abnormal, and then controls switching of the ranges of the automatic transmission, based on the result of the determination.

2. The automatic transmission control apparatus according to claim 1, wherein when it is determined that the first detection signal is abnormal, the controller permits shifting the range of the automatic transmission to an arbitrary range and notifies of the abnormality through a notification means.

3. The automatic transmission control apparatus according to claim 2, wherein the controller drives the motor through sensorless control.

4. The automatic transmission control apparatus according to claim 1, wherein when it is determined that the first detection signal is abnormal, the controller permits shifting the range of the automatic transmission only to P range and notifies of the abnormality through a notification means.

5. The automatic transmission control apparatus according to claim 2, wherein the controller does not permit switching the ranges of the automatic transmission the abnormality in the first detection signal is eliminated.

6. The automatic transmission control apparatus according to claim 1, wherein when it is determined that the first detection signal is abnormal, the controller does not permit switching the range from a present shift position and notifies of the abnormality through a notification means.

7. The automatic transmission control apparatus according to claim 1, wherein when it is determined that the second detection signal is abnormal, the controller calculates a rotation angle of the output axle, based on a count value of pulses included in the first detection signal and a decelerating ratio of the deceleration mechanism, permits shifting the range of the automatic transmission to an arbitrary range based on the result of the calculation, and notifies of the abnormality through a notification means.

8. The automatic transmission control apparatus according to claim 1, wherein when it is determined that the second detection signal is abnormal, the controller calculates a rotation angle of the output axle, based on a count value of pulses included in the first detection signal and a decelerating ratio of the deceleration mechanism, permits shifting the range of the automatic transmission only to P range based on the result of the calculation, and notifies of the abnormality through a notification means.

9. The automatic transmission control apparatus according to claim 7, wherein the controller does not permit switching the ranges of the automatic transmission the abnormality in the second detection signal is eliminated.

10. The automatic transmission control apparatus according to claim 1, wherein when it is determined that the second detection signal is abnormal, the controller does not permit switching the range from a present shift position and notifies of the abnormality through a notification means.

11. The automatic transmission control apparatus according to claim 1, wherein when it is determined that the third detection signal is abnormal, the controller does not permit switching the range from a present shift position and notifies the driver of the abnormality through a notification means.

12. The automatic transmission control apparatus according to claim 1,
    wherein the motor, the deceleration mechanism, and the output axle are integrated in a housing so as to configure a range switching device, and
    wherein the motor rotation angle detector and the output axle rotation angle detector are provided in the range switching device.

13. The automatic transmission control apparatus according to claim 1,
    wherein the motor rotation angle detector has a hall-switch magnetic sensor, and
    wherein the hall-switch magnetic sensor is provided in such a way as to be spaced a gap apart from one axle-direction end of the rotor and detects a rotation angle of the rotor in response to a leakage magnetic field of a permanent magnet that forms a magnetic-field pole of the rotor.

14. The automatic transmission control apparatus according to claim 1,
wherein the output axle rotation angle detector has a flux-orientation-detection magnetic sensor, and
wherein the flux-orientation-detection magnetic sensor detects a magnetic orientation of a two-pole-magnetized permanent magnet provided on the output axle so as to detect a rotation angle of the output axle.

15. The automatic transmission control apparatus according to claim 1,
wherein the motor rotation angle detector has a hall-switch magnetic sensor,
wherein the hall-switch magnetic sensor is provided in such a way as to be spaced a gap apart from one axle-direction end of the rotor and detects a rotation angle of the rotor in response to a leakage magnetic field of a permanent magnet that forms a magnetic-field pole of the rotor,
wherein the output axle rotation angle detector has a flux-orientation-detection magnetic sensor,
wherein the flux-orientation-detection magnetic sensor detects a magnetic orientation of a two-pole-magnetized permanent magnet provided on the output axle so as to detect a rotation angle of the output axle, and
wherein the hall-switch magnetic sensor and the flux-orientation-detection magnetic sensor are provided on a single and same circuit board.

* * * * *